US012451090B2

(12) United States Patent
Son

(10) Patent No.: US 12,451,090 B2
(45) Date of Patent: Oct. 21, 2025

(54) DISPLAY SYSTEM CONTROL DEVICE AND CONTROL METHOD THEREOF

(71) Applicant: HYUNDAI MOBIS CO., LTD., Seoul (KR)

(72) Inventor: Ho Won Son, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 18/643,069

(22) Filed: Apr. 23, 2024

(65) Prior Publication Data

US 2025/0061865 A1 Feb. 20, 2025

(30) Foreign Application Priority Data

Aug. 18, 2023 (KR) ........................ 10-2023-0108193

(51) Int. Cl.
*G09G 3/36* (2006.01)
*G09G 3/20* (2006.01)
*G09G 3/34* (2006.01)

(52) U.S. Cl.
CPC ................. *G09G 3/36* (2013.01); *G09G 3/20* (2013.01); *G09G 3/3607* (2013.01);
(Continued)

(58) Field of Classification Search
CPC ... G09G 2320/0673; G09G 2320/0626; G09G 2320/0247; G09G 3/2003; G09G 3/3406; G09G 3/36; G09G 3/3607; G09G 3/3611; G09G 2320/068; G09G 2320/0686; G09G 2320/045; G09G 2320/06; G09G 2320/0646; G09G 2360/16; G09G 2320/0666; G09G 2320/0271; G09G 2320/0276; G09G 2320/066;
(Continued)

(56) References Cited

U.S. PATENT DOCUMENTS

| | | | | |
|---|---|---|---|---|
| 9,772,756 | B2 | 9/2017 | Chang et al. | |
| 2004/0114396 | A1* | 6/2004 | Kobayashi ........... | G09G 3/3648 362/555 |

(Continued)

OTHER PUBLICATIONS

European Search report in issued on Aug. 1, 2024 for corresponding EP Patent Application No. 24172039.0.

*Primary Examiner* — Dismery Mercedes
(74) *Attorney, Agent, or Firm* — Morgan, Lewis & Bockius LLP

(57) ABSTRACT

A display system control device includes: a memory unit storing at least one of a reference color coordinate value for each control mode or a reference luminance value for each control mode, a display color coordinate value, and a display luminance value; and a control unit controlling the display system based on a received control mode and the information stored in the memory unit, wherein based on the received control mode, the control unit corrects the display color coordinate value based on the reference color coordinate value for each control mode, corrects the display luminance value based on the reference luminance value for each control mode, or corrects the display color coordinate value and the display luminance value respectively based on the reference color coordinate value for each control mode and the reference luminance value for each control mode.

2 Claims, 2 Drawing Sheets

(52) U.S. Cl.
CPC ... *G09G 3/3406* (2013.01); *G09G 2320/0242* (2013.01); *G09G 2320/0276* (2013.01); *G09G 2320/0626* (2013.01); *G09G 2320/0666* (2013.01); *G09G 2320/0673* (2013.01); *G09G 2320/068* (2013.01); *G09G 2358/00* (2013.01); *G09G 2380/10* (2013.01)

(58) Field of Classification Search
CPC ......... G09G 2340/06; G09G 2320/062; G09G 2320/0242; G09G 2320/028; G09G 3/20; G09G 2310/0237; G09G 2380/10
See application file for complete search history.

(56) References Cited

U.S. PATENT DOCUMENTS

| | | | | |
|---|---|---|---|---|
| 2011/0109661 | A1* | 5/2011 | Lee | G09G 3/20 345/690 |
| 2011/0141002 | A1* | 6/2011 | Kim | G09G 3/342 345/102 |
| 2014/0307007 | A1* | 10/2014 | Cho | G09G 3/3648 345/102 |
| 2015/0009114 | A1* | 1/2015 | Chen | G09G 3/342 345/102 |
| 2015/0138251 | A1* | 5/2015 | Pyo | G09G 3/3233 345/82 |
| 2015/0364094 | A1* | 12/2015 | Takasaki | G09G 3/342 345/593 |
| 2017/0032744 | A1* | 2/2017 | Yoo | G09G 3/2007 |
| 2020/0335042 | A1* | 10/2020 | Son | G09G 3/3291 |
| 2021/0063783 | A1* | 3/2021 | Byoun | B60K 35/29 |
| 2021/0097918 | A1 | 4/2021 | Wang | |
| 2021/0110752 | A1* | 4/2021 | Kim | G09G 3/2092 |
| 2021/0240021 | A1* | 8/2021 | Hsieh | G02F 1/1334 |
| 2023/0150439 | A1 | 5/2023 | Chen et al. | |
| 2023/0230521 | A1* | 7/2023 | Wu | G09G 3/3208 345/428 |
| 2024/0194133 | A1* | 6/2024 | Hong | G09G 3/3233 |
| 2024/0420657 | A1* | 12/2024 | Hirai | G09G 3/3607 |

* cited by examiner

[FIG. 1]
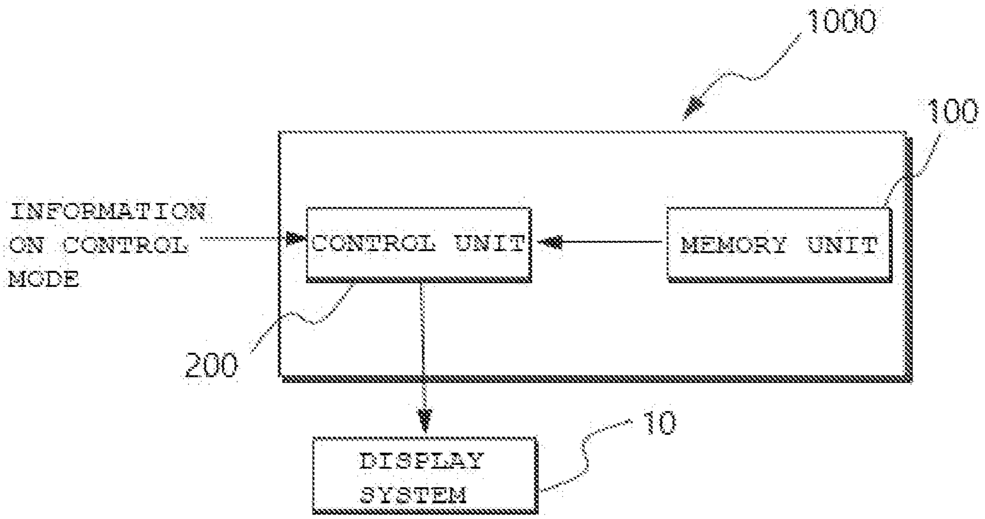

[FIG. 2]
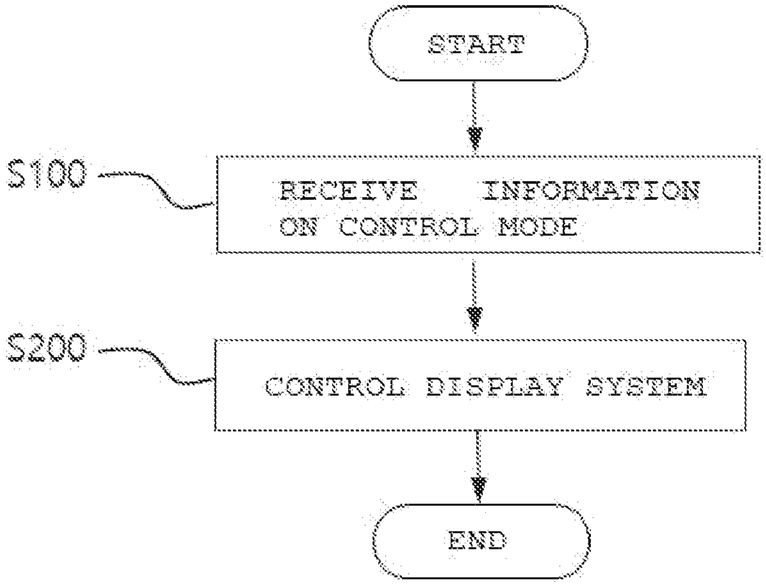

DISPLAY SYSTEM CONTROL DEVICE AND CONTROL METHOD THEREOF

CROSS-REFERENCE TO RELATED APPLICATIONS

This application claims priority under 35 U.S.C. § 119 to Korean Patent Application No. 10-2023-0108193, filed on Aug. 18,2023, in the Korean Intellectual Property Office, the disclosure of which is incorporated herein by reference in its entirety.

TECHNICAL FIELD

The following disclosure relates to a display system control device and a control method thereof.

BACKGROUND

A display system of a vehicle may be mainly installed on the instrument panel, central console, entertainment system, or the like of the vehicle, and visually deliver information to a driver and a passenger in the vehicle. For example, a driving information display system may provide driving-related information such as the speed, a revolution per minute (RPM), a fuel level, a mileage, or the like of the vehicle. This display may be often mounted on the instrument panel, may be configured as a digital display panel, or may be provided as a combined analog and digital display. In recent years, an electronic instrument panel has been used more, and a virtual or customized display shape may be selected in some cases. In addition, the display system on the central console may be mainly connected to an information entertainment system of the vehicle. The display may provide a navigation system, a multimedia playback, a communication function, or the like. A lot of vehicles may use a touch screen interface to allow a user to easily access and control the functions. In addition, in some vehicles, a voice recognition function may allow the driver to perform a task such as entering a destination or connecting a mobile phone. In addition, as an era of an electric vehicle and autonomous driving begins, the display system may have an increasingly larger size and a higher resolution, and is continuously evolving to provide more convenient and useful information to the driver and the passenger.

In addition to the functions described above, a co-driver display which is also a type of the display may allow the passenger in addition to the driver to check and interact with information. This display may be mainly mounted on the central console or in front of a co-driver seat, and may provide a variety of functions such as entertainment, navigation, communication, and the like, these functions being recently spotlighted in the market.

Meanwhile, as the display becomes larger and more diverse, the display within a driver's view may also become wider and more numerous. In addition, image noise may occur due to a co-driver seat display image, which may disturb the driver's driving while driving. Accordingly, it may be important to reduce a frequency of the image noise occurring in the driver's view during the driving. Recently, a major original equipment (OE) may have an increasing requirement for a display having viewing angle control technology that may limit viewing of a multimedia image to a driver direction of a front passenger display. In addition, in addition to the driver seat direction, a side-window reflection may also be restricted because such a reflection may disturb the vehicle driving.

SUMMARY

An embodiment of the present disclosure is directed to providing a display system control device capable of compensating for changes in luminance and color coordinates when one control mode is changed to another control mode among the plurality of control modes in a display system including a viewing angle control mode which may limit a driver's image viewing for each display type, and a control method thereof.

In one general aspect, a display system control device may include: a memory unit storing information including at least one of a reference color coordinate value or a reference luminance value for each control mode of a plurality of control modes of a display device, a display color coordinate value, and a display luminance value; and a control unit configured to control the display system based on a received control mode among the plurality of control modes and the information stored in the memory unit. Based on the received control mode, the control unit is further configured to correct the display color coordinate value based on the reference color coordinate value for each control mode, correct the display luminance value based on the reference luminance value for each control mode, or correct the display color coordinate value and the display luminance value respectively based on the reference color coordinate value for each control mode and the reference luminance value for each control mode.

When the received control mode is changed to a changed control mode, the control unit may correct the display luminance value based on the reference luminance value for each control mode corresponding to the changed control mode, and correct the display luminance value by controlling a light amount of the display system.

When the received control mode is changed to a changed control mode, the control unit may correct the display color coordinate value based on the reference color coordinate value for each control mode corresponding to the changed control mode, and correct the display color coordinate value by gamma correction of the display system.

In another general aspect, a control method of a display system control device which includes a memory unit and a control unit may include: (a) receiving, by the control unit, information on a control mode among a plurality of control modes of a display device; and (b) controlling, by the control unit, the display system based on the received control mode and information stored in the memory unit. In the operation (b), based on the received control mode, a display color coordinate value is corrected based on a reference color coordinate value for each control mode of the plurality of control modes, a display luminance value is corrected based on a reference luminance value for each control mode, or the display color coordinate value and the display luminance value are respectively corrected based on the reference color coordinate value for each control mode and the reference luminance value for each control mode.

In the operation (b), when the received control mode is changed to a changed control mode, the display luminance value may be corrected based on the reference luminance value for each control mode corresponding to the changed control mode, and the display luminance value may be corrected by controlling a light amount of the display system.

In the operation (b), when the received control mode is changed to a changed control mode, the display color coordinate value may be corrected based on the reference color coordinate value for each control mode corresponding to the changed control mode, and the display color coordinate value may be corrected by gamma correction of the display system.

BRIEF DESCRIPTION OF THE DRAWINGS

FIG. 1 is a schematic view showing a display system control device according to another embodiment of the present disclosure.

FIG. 2 is a flowchart showing a display system control method according to an embodiment of the present disclosure.

DETAILED DESCRIPTION OF EMBODIMENTS

In order to describe the present disclosure, operational advantages of the present disclosure, and objects accomplished by embodiments of the present disclosure, the embodiments of the present disclosure are hereinafter exemplified and described with reference to the accompanying drawings.

First, terms used in this application are used only to describe specific embodiments rather than limiting the present disclosure, and a term of a singular number may include its plural number unless explicitly indicated otherwise in the context. In addition, it is to be understood that a term "include," "have", or the like used in this application specifies the existence of features, numerals, steps, operations, components, parts, or combinations thereof, which are mentioned in the specification, and does not preclude the existence or addition of one or more other features, numerals, steps, operations, components, parts, or combinations thereof.

Further, in describing the embodiments of the present disclosure, well-known functions or constructions will not be described in detail because these functions or constructions may unnecessarily obscure the understanding of the present disclosure.

FIG. 1 is a schematic view showing a display system control device 1000 according to another embodiment of the present disclosure.

The display system control device 1000 mentioned herein may indicate a device correcting at least one of the luminance value or color coordinate value of a display system 10 including a plurality of control modes including first and second control modes.

In detail, luminance of the display may be changed when the control mode is changed. The reason is that a difference in panel transmittance may occur as a separate switching cell or light guide plate (LGP) is added for each type of the display system 10. Accordingly, a difference may occur in a voltage applied to a liquid crystal of the display system 10, resulting in a luminance difference.

In addition, a difference in color coordinates may occur based on the rotation level or direction of a liquid crystal of the switching cell and interference of the LGP.

Therefore, to solve this problem, the display system control device 1000 according to an embodiment of the present disclosure may include a memory unit 100 and a control unit 200.

The memory unit 100 may include a flash memory (not shown) and an electronically erasable and programmable ROM (EEPROM, not shown). The flash memory may refer to a non-volatile computer memory device that may electrically erase and rewrite data, and store the color coordinate values of the display system 10. In addition, the EEPROM which is a non-volatile computer memory device that may electrically erase and rewrite data may store the luminance value of the display system 10. In addition, the memory unit 100 may store at least one of a reference color coordinate value or a reference luminance value for each control mode of the display system 10.

The control unit 200 may control the display system 10 based on the received control mode and the information stored in the memory unit 100.

The control unit 200 of the display system control device 1000 according to an exemplary embodiment of the present disclosure may be a processor (e.g., computer, microprocessor, CPU, ASIC, circuitry, logic circuits, etc.). The control unit 200 may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

Here, the control unit 200 may correct the display color coordinate value based on the reference color coordinate value for each of the plurality of control modes based on any one of the plurality of control modes of the display system 10. In addition, the control unit 200 may correct the display luminance value based on the reference luminance value for each of the plurality of control modes. In addition, the control unit 200 may correct the display color coordinate value and the display luminance value respectively based on the reference color coordinate value for each of the plurality of control modes and the reference luminance value for each control mode.

For example, described is a case where the control mode of the display system 10 is changed from a first control mode to a second control mode when the first control mode refers to a public mode and the second control mode refers to a privacy mode. The public mode mentioned herein may refer to a mode where passengers in a driver seat and a co-driver seat may share the display, and the privacy mode may refer to a mode where a viewing angle of the display is limited and the display may be provided only to the passenger. Meanwhile, in this case, the control unit 200 may correct the display luminance value based on the reference luminance value stored in the memory unit 100, and may correct the display luminance value by controlling a light amount of the display.

In detail, the control unit 200 may control the light amount of the display by adjusting a duty ratio. The duty ratio mentioned herein may refer to adjusting a light intensity of a light source by adjusting its on and off timings. The light source may be turned on as much as an on duty timing of a dimming signal, and the higher the duty ratio, the brighter the luminance. For example, the light source may be lit at 100% and its brightness may be 100% in a case of 100% dimming, and the light source may be lit at 70% and its brightness may be 70% in a case of 70% dimming. Through this configuration, the control unit 200 may control the display for the light source to be repeatedly turned on and off at a frequency of a visible frequency or more.

In more detail, the control unit 200 may control a drive unit 330 to increase the duty ratio of the light source of the display system 1000 when the first control mode is changed to the second control mode for example.

The control unit 200 may correct not only the luminance but also the color coordinates. In addition, the control unit 200 may correct the display color coordinate value based on the reference color coordinate value in the memory unit 100 when the first control mode is changed to the second control mode. Here, the control unit 200 may also correct the color coordinate value by further performing gamma correction.

Gamma may refer to a value for determining a correlation between brightness of a signal input to the display system 10 and luminance of an image displayed on a screen. A brightness tone displayed on the same screen may be different based on a gamma value. The input and output brightness may be the same as each other when the gamma value is 1, the screen may be displayed darkly in a mid/low gradation region when the gamma value is greater than 1, and conversely, the screen may be displayed brightly when the gamma value is less than 1.

Meanwhile, according to a control method of a display system control device 1000 including a memory unit 100 and a control unit 200 according to another embodiment of the present disclosure, the control unit 200 may receive information on a control mode in an operation S100, and control output of a display system 10 based on the received control mode in an operation S200. Here, in the operation S200, the control unit 200 may correct a display color coordinate value based on a reference color coordinate value for each of the plurality of control modes based on any one control mode among the plurality of control modes of the display system 10. In addition, the control unit 200 may correct a display luminance value based on a reference luminance value for each of the plurality of control modes. In addition, the control unit 200 may correct the display color coordinate value and the display luminance value respectively based on the reference color coordinate value for each of the plurality of control modes and the reference luminance value for each control mode.

In detail, in the operation S200, the control unit 200 may correct the display luminance value based on the reference luminance value stored in the memory unit 100 when a first control mode is changed to a second control mode among the plurality of control modes. Here, the control unit 200 may correct the display luminance value by controlling a light amount of the display.

In more detail, the control unit 200 may control the driver 330 to increase the duty ratio of the light source of the display system 1000 when the first control mode is changed to the second control mode for example.

In addition, in the operation S200, the control unit 200 may correct not only the luminance but also color coordinates of the display. In addition, the control unit 200 may correct the display color coordinate value based on the reference color coordinate value in the memory unit 100 when the first control mode is changed to the second control mode for example. Here, the control unit 200 may also correct the color coordinate value by adding gamma correction.

As set forth above, the display system control device and the control method thereof according to the various embodiments of the present disclosure as described above may change the mode not to disturb the driver's view, thereby promoting the safety of the driver, the passenger, or a pedestrian.

Further, the present disclosure may promote the safety by reducing the driver's inconvenience and emotional changes caused by the mode change.

Furthermore, the present disclosure may use such a physically simple structure, thereby securing higher reliability.

Although the embodiments of the present disclosure are described as above, the embodiments disclosed in the present disclosure are provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited to these embodiments. In addition, it is apparent to those skilled in the art to which the present disclosure pertains that various variations and modifications could be made without departing from the spirit and scope of the appended claims, and all such appropriate variations and modifications should be considered as falling within the scope of the present disclosure as equivalents.

What is claimed is:

1. A display system control device having a color correction function, the device comprising:

a memory unit storing information including a display color coordinate value, a display luminance value, a reference color coordinate value, and a reference luminance value for each control mode of a plurality of control modes of a display system, wherein the display system includes switching cells; and a control unit configured to control the display system based on a received control mode among the plurality of control modes and the information stored in the memory unit, wherein upon control mode transition, the control unit is further configured to:

compensate for luminance changes caused by voltage differences due to panel transmittance differences between the switching cells and an LGP (Light Guide Plate) of the display system, and color coordinate changes caused by liquid crystal rotation of the switching cells and interference of the LGP, by correcting the display color coordinate value and the display luminance value respectively based on the reference color coordinate value corresponding to the received control mode and the reference luminance value corresponding to the received control mode, wherein when the received control mode is changed to a changed control mode, the control unit is further configured to:

correct the display luminance value based on the reference luminance value corresponding to the changed control mode by controlling a light amount of a light source of the display system through duty ratio adjustment, wherein the light source of the display system is turned on according to an on duty timing of a dimming signal and repeatedly switched on and off at a frequency above a visible frequency, and correct the display color coordinate value based on the reference color coordinate value corresponding to the changed control mode through gamma correction of the display system.

2. A control method of a display system control device which includes a memory unit and a control unit, the method comprising:

(a) receiving, by the control unit, information, including a display color coordinate value and a display luminance value, on a control mode among a plurality of control modes of a display system, wherein the display system includes switching cells; and (b) controlling, by the control unit, the display system based on a received control mode and information stored in the memory unit, wherein in the operation (b), upon control mode transition, the control unit compensates for luminance changes caused by voltage differences due to panel transmittance differences between the switching cells and an LGP (Light Guide Plate) of the display system, and color coordinate changes caused by liquid crystal rotation of the switching cells and interference of the LGP, by correcting the display color coordinate value and the display luminance value respectively based on a reference color coordinate value corresponding to the received control mode and a reference luminance value corresponding to the received control mode, and when the received control mode is changed to a changed control mode, the control unit corrects the display luminance value based on the reference luminance value corresponding to the changed control mode by controlling a light amount of a light source of the display system through duty ratio adjustment, wherein the light source of the display system is turned on according to an on duty timing of a dimming signal and repeatedly switched on and off at a frequency above a visible frequency, and corrects the display color coordinate value based on the reference color coordinate value corresponding to the changed control mode through gamma correction of the display system.

* * * * *